July 16, 1968 — F. T. JANES — 3,392,948

SLIDE RULE MOUNTING STRUCTURE

Filed Jan. 27, 1966 — 2 Sheets-Sheet 1

INVENTOR.
FRANK T. JANES
BY
Braddock + Burd
ATTORNEYS

July 16, 1968  F. T. JANES  3,392,948
SLIDE RULE MOUNTING STRUCTURE
Filed Jan. 27, 1966  2 Sheets-Sheet 2

INVENTOR.
FRANK T. JANES
BY
Braddock+Burd
ATTORNEYS

United States Patent Office 3,392,948
Patented July 16, 1968

3,392,948
SLIDE RULE MOUNTING STRUCTURE
Frank T. Janes, 5225 Woodlawn Blvd.,
Minneapolis, Minn. 55417
Filed Jan. 27, 1966, Ser. No. 523,434
8 Claims. (Cl. 248—201)

ABSTRACT OF THE DISCLOSURE

A demonstration slide rule horizontally mounted for pivotal movement between a pair of upright brackets secured to a classroom wall above a blackboard. Each bracket is a U-shaped member having a plate at its upper end accommodating screws securing the brackets to the classroom wall. Sleeves secured to the lower legs of the brackets receive pivot pins threaded into the lower ends of the slide rule to pivotally mount the slide rule on the brackets. Spring biased lock pins mounted in cup members attached to the upper legs of the brackets project into holes in the opposite ends of the upper part of the slide rule to releasably lock the slide rule in the up position. When the lock pins are removed from the holes, the slide rule can pivot about the pivot pins to the lower position so that the opposite side of the slide rule can be viewed by the class.

---

This invention relates generally to teaching apparatus and more particularly to a means for holding a class room demonstration size slide rule so that the front side and the back side of the slide rule may be easily and selectively viewed.

A class room demonstration size slide rule is a large linear slide rule constructed with cooperating scales on the front side and the back side of the slide rule. In use, the scales are aligned with a hair line slide to obtain a reading. A slide setting can be made on one side of the slide rule, the rule turned over for reading a cooperating scale on the back side. When this is done the slide rule must be mounted so that it can be turned about a longitudinal axis.

The mounting structure presently available for the purpose of securing a class room demonstration size slide rule to a support, as a classroom wall, is in the general form of a cradle holding the slide rule. A cradle type slide rule holder does not allow the slide rule to be readily turned over for reading a scale on the back side without the possibility of disturbing the setting of the hair line slide as well as the position of the movable center member. These prior demonstration slide rule holders are not designed to minimize obstruction of a classroom blackboard while at the same time the holders keep the slide rules at a location and elevation convenient to work with. The slide rule supporting structure of the present invention has eliminated these problems by pivotally mounting the slide rule for movement about a horizontal axis so that it can be easily positioned to show the back side and the front side of the slide rule without disturbing the hair line slide setting once made. The slide rule is movable to two positions to selectively expose both sides of the rule.

In the present invention a large linear demonstration slide rule is supported on an upright wall by a pair of mounting units located adjacent opposite ends of the slide rule. The mounting units horizontally support and permit the slide rule to be pivoted so that the front side and the back side of the slide rule may be selectively viewed. Pivot means cooperating with opposite ends of the slide rule are utilized for pivotally securing the bottom portion of the front side of the slide rule to the mounting unit for movement about a generally horizontal axis. The slide rule can be turned approximately 180° about the axes of the pivot means from an upper position in which the front side can be viewed to a lower position wherein the back side can be viewed. Locking means secured to the top of the bracket units selectively engage the slide rule to hold the slide rule against the pivoting. The locking means hold the slide rule in the upper position. When it is desired to view the back side of the slide rule the locking means are released and the slide rule is pivoted downwardly to the lower position exposing the back side. The mounting units hold the slide rule space from the wall so that on movement of the slide rule there is no interference from the wall. Maximum blackboard space is available when the slide rule is moved to the upper position and held there by the locking means.

Figure 1:
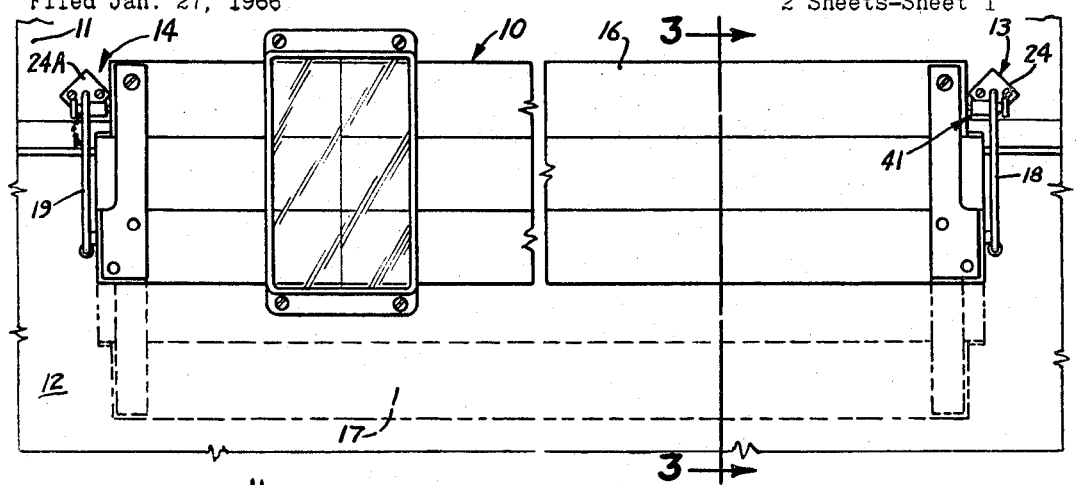
FIG. 1 is a foreshortened front elevational view of a demonstration size linear slide rule secured to a wall above a classroom blackboard with the mounting structure of this invention showing the slide rule in a lower position in broken lines and in the alternative upper position in full lines.

Referring to the drawings there is shown in FIG. 1, a large classroom demonstration size linear slide rule 10 horizontally supported on a wall 11 above a blackboard 12 with the mounting units of this invention indicated generally at 13 and 14. Slide rule 10 is shown in full lines in an upper position wherein the front side 16 is in an upright plane and in view and shown in broken lines in a lower position wherein the backside 17 is in an upright plane and in view. Mounting units 13 and 14 can be attached to any upright support to horizontally position the slide rule for maximum viewing. To provide for maximum utilization of blackboard space mounting units are preferably secured to wall 11 above blackboard 12 so that when the slide rule 10 is in the upper position the entire blackboard can be viewed.

Mounting units 13 and 14 located adjacent opposite ends of slide rule 10 comprise generally U-shaped elongated brackets 18 and 19 respectively secured in spaced relation to wall 11 above blackboard 12. Bracket 18 has inwardly directed upper and lower legs 21 and 22 connected with an upright back 23 spaced from wall 11 and blackboard 12. Legs 21 and 22 and back 23 are formed from a single rod into a U-shaped member. An upright plate 24 is attached by welds, brazing or the like to the end of upper leg 21. Plate 24 is positioned normal to the upright plane of leg 21. A pair of screws 26 project through suitable spaced holes in plate 24 to secure bracket 18 to wall 11. Lower end of leg 22 is covered with a cup member 27, as a rubber boot, to protect the blackboard 12.

Bracket 19 is identical in size and shape with bracket 18. Parts of bracket 19 corresponding to the same parts of bracket 18 are identified with the same reference numeral having the suffix A.

Figure 2:
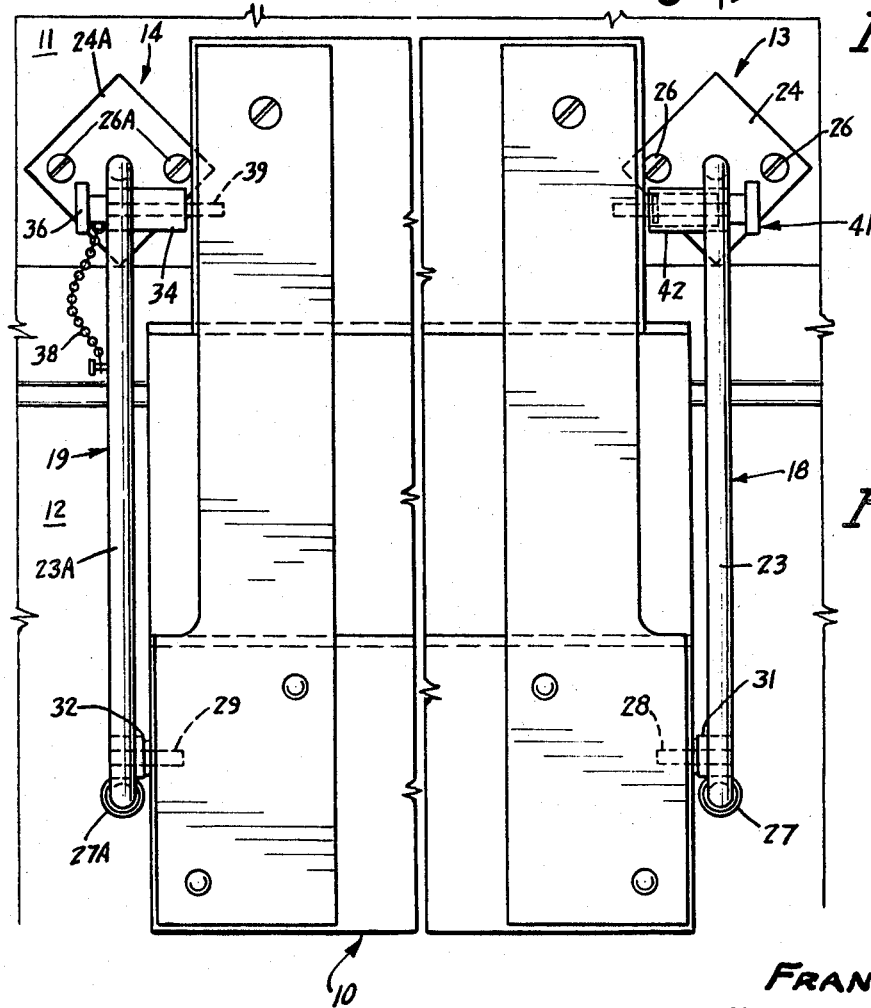
FIG. 2 is a foreshortened front elevational view drawn to a larger scale than FIG. 1 more clearly showing the locking means and pivoting means of the mounting structure.
Figure 5:
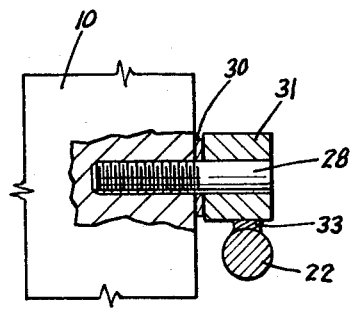
FIG. 5 is an enlarged sectional view taken along the line 5—5 of FIG. 3 showing the pivoting means secured to the lower portion of the slide rule.

The horizontal spacing between brackets 18 and 19 is determined by the length of the slide rule. The brackets 18 and 19 extend upwardly adjacent opposite ends of the slide rule. The lower portions of brackets 18 and 19 have pivot means 28, 31 and 29, 32 respectively to pivotally coupled opposite ends of the slide rule to the brackets. The pivot means allow the slide rule 10 to be moved to show both its front side and its back side. Suitable pivot means are demonstrated in FIG. 2 by providing longitudinal trunnions 28 and 29 secured to opposite ends of slide rule 10 near the bottom of the front side. Trunnion bearings 31 and 32 are secured, by welds, brazing or the like, to the lower inside corners of brackets 18 and 19. Trunnion 28, exemplified in FIG. 5, has a bolt or stud threaded into a hole in the end slide rule 10 so as to form a pivot joint in cooperation with bearing 31 shown as a cylindrical sleeve secured to leg 22. A washer 30 separates slide rule 10 from bearing 31. Trunnion 29 and bearing 32 are identical to trunnion 28 and bearing 31. Trunnions 28 and 29 are on the same longitudinal axis of slide rule 10 permitting the slide rule to be pivoted about the common horizontal axes of bearings 31 and 32.

The position of slide rule 10 shown in solid lines in FIG. 1 is called the upper position. In the upper position, the front side 16 of the slide rule 10 may be viewed by a class or the slide rule 10 may be stored. The dotted lines in FIG. 1, show the lower position of the slide rule that is attained when the slide rule is pivoted downwardly approximately 180° to hang from bearings 31 and 32. In the lower position back side 17 of the slide rule can be viewed. Only pivotal movement, not severe manipulation of slide rule 10 is required to change the viewing from the front side to the back side. There is no danger in altering the hair line slide setting on the front side of which the corresponding reading is to be taken on the back side.

When slide rule 10 is in the upper position it is unstable, making it necessary to selectively lock the slide rule in the upper position. To accomplish this a releasable lock attaches slide rule 10 to bracket 19. The lock includes a transverse slide bearing 34 secured near the top of bracket 19 in the upper inside corner of the bracket in vertical alignment with the bottom bearing 32 and a pin 36 slidably positioned in bearing 34. Pin 36 is a headed cylindrical member which can be entirely removed from bearing 34. To prevent loss of pin 36 chain 38 is secured to the head of the pin and back 23A of bracket 19. In the lock position the forward end of pin 36 fits into a hole 39 in the end of slide rule 10 to hold slide rule 10 against pivoting to the lower position. Hole 39 is located near the top of the front side of the slide rule.

Figure 4:
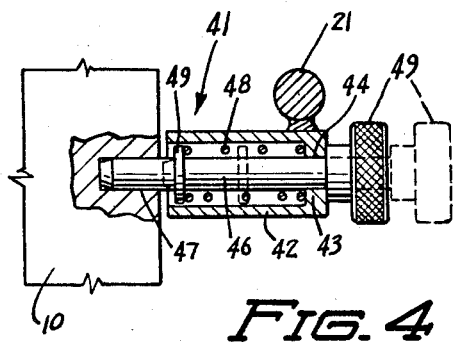
FIG. 4 is an enlarged sectional view taken along the line 4—4 of FIG. 3 showing the lock position of the locking means in full line and the release position of the locking means in broken lines.

Opposite removable pin 36 there is a spring lock indicated generally at 41 mounted on bracket 18. Lock 41 is engageable with slide rule 10 to hold the slide rule in the upper position. As shown in FIG. 4, lock 41 comprises a cylindrical casing 42 secured to leg 21 and projected toward the end of slide rule 10. Casing 42 is located in the upper inside corner of bracket 18 in vertical alignment with bearing 31. The outer end or right end of casing 42 has end wall 43 formed with an axial hole 44. A pin 46 slidably positioned in hole 44 extends axially through casing 42 into a bore in the adjacent end of slide rule 10. Pin 46 is biased into engagement with slide rule 10 by a resilient member 48, as a spring, located concentrically about the pin 46 in casing 42. A washer 49 secured to pin 46 engages the inner end of spring 48. The opposite end of spring 48 engages casing end wall 43. A head 49 on the outer end of pin 46 bears against wall 43 and holds pin 46 and spring 48 in assembled relation with casing 42 such that spring 48 biases the forward end of pin 46 into a hole 47 in the end of slide rule 10.

The mounting units 13 and 14 of this invention provide simple and convenient means for horizontally supporting a large slide rule on a wall. The slide rule requires only minimum modification of a pair of holes in each end to accommodate the mounting units. The lower holes are used to receive studs 28 and 29 which cooperate with bearings 31 and 32 secured to brackets 18 and 19. The pivot joints formed by cooperating studs and bearing allow the slide rule to be angularly moved about a horizontal axis spaced from the wall. As shown in FIG. 1 slide rule 10 is held in an upright horizontal position where the front side 16 may be readily viewed. Brackets 18 and 19 do not interfere with movement of the movable center panel of the slide rule nor movement of the hair line slide.

When it is desired to view the backside 17 of the slide rule, pin 36 is removed from bearing 34 freeing the left end of slide rule 10. Pin 46 is then moved to its release position, shown in broken lines in FIG. 4, against the resilient force of spring 48. In this position the forward portion of pin 46 is withdrawn from hole 47 in slide rule 10. Slide rule is now free to pivot downwardly moving the upper side of slide rule 10 in the direction of arrow 50 shown in FIG. 3. The lower side of slide rule 10 pivots about trunnions 28 and 29 in direction of arrow 51. Slide rule 10 is rotated approximately 180° to the broken line position wherein backside 17 can be viewed.

Figure 3:
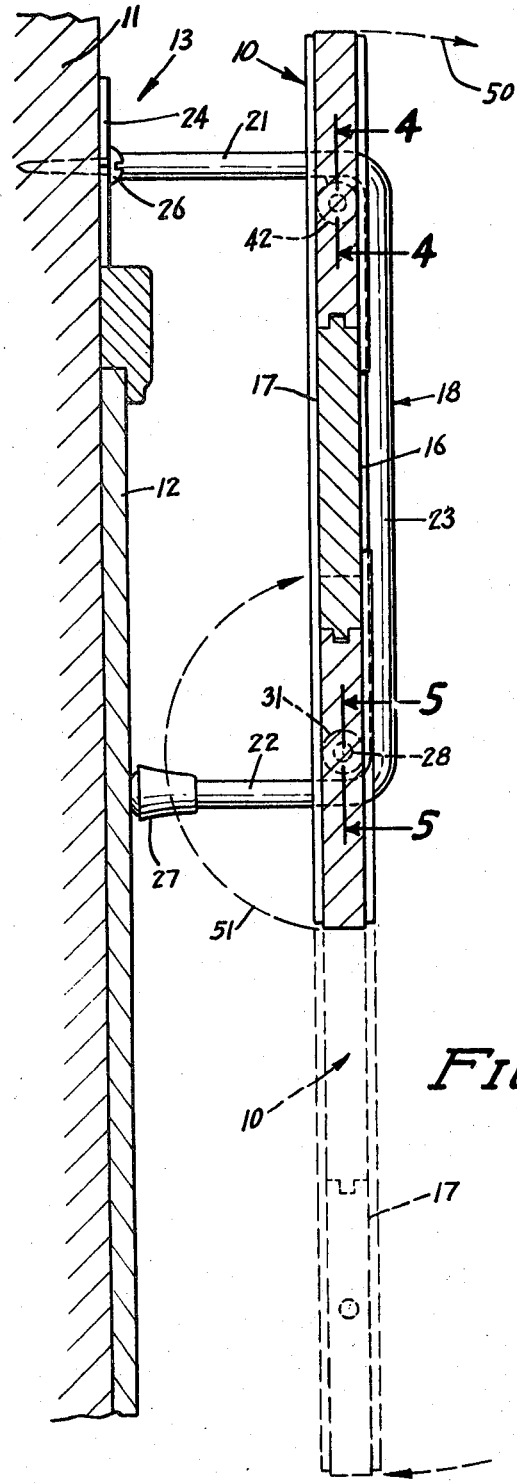
FIG. 3 is an enlarged sectional view taken along the line 3—3 of FIG. 1.

To return the front side 16 to a viewing position or to store the slide rule about the blackboard 12, slide rule 10 is pivoted upwardly to the upper position, shown in full lines in FIGS. 1 and 3. The slide rule is held in this position by placing the forward end of pin 46 in hole 47 of slide rule 10 and positioning pin 36 in bearing 34 with the forward end of pin 36 in hole 39 of slide rule 10.

The invention is to be limited only by the prior art considered with the following claims.

The embodiments of the invention in which an exclusive property or privilege is claimed are defined as follows:

1. In combination, a demonstrating size slide rule and a device for holding a demonstrating size slide rule on a support so that either side of the slide rule may easily and selectively be viewed, said device comprising:
    upright bracket means adapted to be secured to the support, said bracket means located adjacent the ends of the slide rule,
    pivot means for pivotally securing the bottom of said bracket means to the opposite ends of the slide rule near the bottom of the front side of the slide rule so that the slide rule can pivot downward away from the bracket means to expose the backside of the slide rule; and
    locking means secured to the tops of said bracket means for selectively engaging opposite ends of the slide rule near the top of the front side of the slide rule to hold the slide rule against pivoting.

2. The combination of claim 1 wherein the bracket means are elongated vertical members securable to a wall above a classroom blackboard, said pivot means allowing movement of the slide rule to two extreme positions, an upper position which exposes the front side of the slide rule out of the way of the blackboard and a lower position in which the back side of the slide rule may be viewed.

3. The combination of claim 1 wherein said pivot means comprises:
    a shaft secured longitudinally to the slide rule; and
    a bearing secured to said bracket means to pivotally secure said shaft.

4. The combination of claim 1 wherein said locking means comprises:
    bars movably secured to said bracket means,
    said bars engaging and holding the slide rule near the top of the front side.

5. The combination of claim 1 wherein the pivot means comprises:
    a longitudinal trunnion secured to the slide rule near the bottom;
    a transverse journal bearing secured near the bottom of said bracket means, said journal bearing embracing said trunnion to form a pivot joint between said bracket means and the slide rule.

6. The combination of claim 5 wherein the locking means comprises:
- a male member transversely slidably secured to said bracket means; and
- a female member secured to the slide rule, said female member adapted to selectively engage said male member.

7. The combination of claim 6 wherein two of said bracket means are provided and one is disposed near each end of the slide rule.

8. The combination of claim 7 wherein the male member of said locking means for one of said bracket means is resiliently urged into engagement with said corresponding female locking member.

References Cited

UNITED STATES PATENTS

| | | | |
|---|---|---|---|
| 993,051 | 5/1911 | Germain | 248—477 |
| 1,110,973 | 9/1914 | Tischler | 248—201 X |
| 1,396,939 | 11/1921 | Miller | 248—201 X |
| 1,625,260 | 4/1927 | Lee | 248—477 |
| 1,781,545 | 11/1930 | Groenenstein | 248—293 |
| 2,541,664 | 2/1951 | Pollack et al. | 108—8 X |
| 3,028,136 | 4/1962 | Vento | 248—293 |
| 3,244,124 | 4/1966 | Accarino et al. | 108—62 X |
| 3,323,769 | 6/1967 | Rife et al. | 248—201 XR |

ROY D. FRAZIER, *Primary Examiner.*

ROBERT P. SEITTER, *Assistant Examiner.*